(12) United States Patent
Yeh et al.

(10) Patent No.: US 10,634,858 B2
(45) Date of Patent: Apr. 28, 2020

(54) OPTICAL TRANSCEIVER

(71) Applicant: Prime World International Holdings Ltd., New Taipei (TW)

(72) Inventors: Che-Shou Yeh, New Taipei (TW); Hsuan-Chen Shiu, New Taipei (TW); Hsiang-Jen Lu, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/850,766

(22) Filed: Dec. 21, 2017

(65) Prior Publication Data
US 2018/0252871 A1 Sep. 6, 2018

(30) Foreign Application Priority Data

Mar. 3, 2017 (TW) .............................. 106107127 A

(51) Int. Cl.
*G02B 6/38* (2006.01)
*H04B 10/40* (2013.01)
*G02B 6/42* (2006.01)

(52) U.S. Cl.
CPC ............ *G02B 6/387* (2013.01); *G02B 6/4261* (2013.01); *G02B 6/4292* (2013.01); *H04B 10/40* (2013.01); *G02B 6/3821* (2013.01); *G02B 6/3893* (2013.01); *G02B 6/4246* (2013.01); *G02B 6/4277* (2013.01)

(58) Field of Classification Search
CPC .... G02B 6/387; G02B 6/4261; G02B 6/4292; G02B 6/3821; G02B 6/3893; G02B 6/4246; G02B 6/4277; H04B 10/40
See application file for complete search history.

(56) References Cited

U.S. PATENT DOCUMENTS

| 3,944,040 A | * | 3/1976 | Richard | .................. | G07F 17/12 |
| | | | | | 194/292 |
| 6,048,001 A | * | 4/2000 | Miller | .................. | E05B 1/0038 |
| | | | | | 292/194 |
| 6,447,170 B1 | | 9/2002 | Takahashi et al. | | |

(Continued)

OTHER PUBLICATIONS

US Office Action dated Sep. 26, 2018, received in U.S. Appl. No. 15/722,317, 14 pgs.

*Primary Examiner* — Peter Radkowski
(74) *Attorney, Agent, or Firm* — Grossman Tucker Perreault & Pfleger, PLLC

(57) ABSTRACT

An optical transceiver includes a casing, a fastening member, a pivotal member and a driving member. The driving member is disposed on the casing, and the driving member is movable relative to the casing in a press direction. The pivotal member includes a pivoting shaft and a pressed portion connected to each other. The pivoting shaft of the pivotal member is pivoted on the casing. The pressed portion has a pressed point, and a virtual line passing through the pressed portion and the pivoting shaft is non-parallel to the press direction. When the driving member is moved in the press direction to press the pressed point, the pivotal member is pivoted. The fastening member is movably disposed on the casing to be either in a fastened position or a released position. The pivotal member is pivotable to move the fastening member from the fastened position to the released position.

11 Claims, 9 Drawing Sheets

(56) References Cited

U.S. PATENT DOCUMENTS

| | | | | |
|---|---|---|---|---|
| 6,886,222 | B2* | 5/2005 | Vitry | E05B 77/04 16/349 |
| 6,957,979 | B2* | 10/2005 | Welsh | H05K 7/1409 439/545 |
| 7,032,939 | B2* | 4/2006 | Magnusson | E05B 63/20 292/121 |
| 7,066,765 | B2* | 6/2006 | Togami | G02B 6/4277 439/607.24 |
| 7,185,927 | B2* | 3/2007 | Talukdar | E05B 83/30 292/124 |
| 7,204,712 | B2* | 4/2007 | Schwiebert | G02B 6/4201 439/352 |
| 7,313,937 | B2* | 1/2008 | Straka, Jr. | E05B 13/10 292/336.3 |
| 7,374,347 | B1* | 5/2008 | Oki | G02B 6/4201 385/88 |
| 7,422,457 | B1* | 9/2008 | Wu | G02B 6/4201 439/258 |
| 7,537,476 | B1* | 5/2009 | McColloch | G02B 6/4201 439/157 |
| 7,566,245 | B1* | 7/2009 | McColloch | G02B 6/4201 439/607.2 |
| 7,648,289 | B2* | 1/2010 | Miyoshi | G02B 6/4201 385/139 |
| 7,901,017 | B1* | 3/2011 | Kafferlin | A47B 88/467 312/219 |
| 8,506,172 | B2 | 8/2013 | Meadowcroft et al. | |
| 8,790,022 | B2* | 7/2014 | Yi | G02B 6/4284 385/89 |
| 8,986,036 | B2 | 3/2015 | Lindkamp | |
| 9,028,155 | B2* | 5/2015 | Wang | G02B 6/4261 385/92 |
| 9,176,289 | B2* | 11/2015 | Yi | G02B 6/4278 |
| 9,348,101 | B2* | 5/2016 | Wang | H01R 13/6335 |
| 9,470,859 | B2* | 10/2016 | Arekar | G02B 6/4261 |
| 9,523,826 | B2 | 12/2016 | Tsai et al. | |
| 9,798,099 | B2 | 10/2017 | Nguyen | |
| 9,841,568 | B2* | 12/2017 | Wang | H01R 13/6335 |
| 2003/0198025 | A1* | 10/2003 | Cao | G02B 6/3897 361/728 |
| 2005/0226587 | A1* | 10/2005 | Minota | G02B 6/4292 385/134 |
| 2009/0321301 | A1* | 12/2009 | Song | G02B 6/4201 206/701 |
| 2012/0106903 | A1* | 5/2012 | Thirugnanam | G02B 6/4246 385/92 |
| 2013/0322832 | A1* | 12/2013 | Wang | G02B 6/4261 385/92 |
| 2014/0038447 | A1 | 2/2014 | Brown et al. | |
| 2014/0126957 | A1* | 5/2014 | Shi | G02B 6/4246 403/322.1 |
| 2014/0168906 | A1* | 6/2014 | Yi | G02B 6/4278 361/728 |
| 2014/0169749 | A1* | 6/2014 | Yi | G02B 6/4284 385/135 |
| 2015/0263453 | A1* | 9/2015 | Wang | H01R 13/6335 385/76 |
| 2015/0331210 | A1* | 11/2015 | Lee | G02B 6/4277 385/89 |
| 2016/0130840 | A1* | 5/2016 | Garneau | E05B 47/0012 292/201 |
| 2016/0174394 | A1* | 6/2016 | Lee | G02B 6/4261 361/747 |
| 2016/0178856 | A1 | 6/2016 | Chang et al. | |
| 2016/0216460 | A1 | 7/2016 | Yang et al. | |
| 2016/0252691 | A1* | 9/2016 | Arekar | G02B 6/4261 385/92 |
| 2016/0341913 | A1* | 11/2016 | Wang | H01R 13/6335 |

* cited by examiner

OPTICAL TRANSCEIVER

CROSS-REFERENCE TO RELATED APPLICATIONS

This non-provisional application claims priority under 35 U. S. C. § 119(a) on Patent Application No(s). 106107127 filed in Taiwan on Mar. 3, 2017, the entire contents of which are hereby incorporated by reference.

TECHNICAL FIELD

The disclosure relates to an optical transceiver, more particularly to a pluggable optical transceiver.

BACKGROUND

Optical transceivers are commonly used in modern high-speed communication networks. Generally, the optical transceivers are pluggable into a receptacle of a communication device, which is beneficial to improve the design flexibility and to perform maintenance. The receptacle is disposed on a circuit board. The XFP (10 Gigabit Small Form Factor Pluggable) and the QSFP (Quad Small Form-factor Pluggable) are standards for the optical transceivers in order to define the electrical and the mechanical interfaces between the optical transceiver and the corresponding receptacle.

SUMMARY

The present disclosure provides an optical transceiver.

One embodiment of the disclosure provides an optical transceiver configured for being plugged into a receptacle having a fastening portion. The disclosed optical transceiver includes a casing, a driving member, a pivotal member and a fastening member. The driving member is disposed on the casing, and is movable with respect to the casing in a press direction. The one pivotal member includes a pivoting shaft and a pressed portion connected to each other. The pivoting shaft of the pivotal member is pivoted on the casing. The pressed portion has a pressed point, and a virtual line passing through the pressed point and the pivoting shaft is not parallel to the press direction. When driving member is moved in the press direction to press the pressed point, the pivotal member is pivoted. The fastening member is movably disposed on the casing to be either in a fastened position or a released position. The pivotal member is pivotable to move the fastening member from the fastened position to the released position.

BRIEF DESCRIPTION OF THE DRAWINGS

The present disclosure will become more fully understood from the detailed description given here in below and the accompanying drawings which are given by way of illustration only and thus are not intending to limit the present disclosure and wherein.

DETAILED DESCRIPTION

Figure 1:
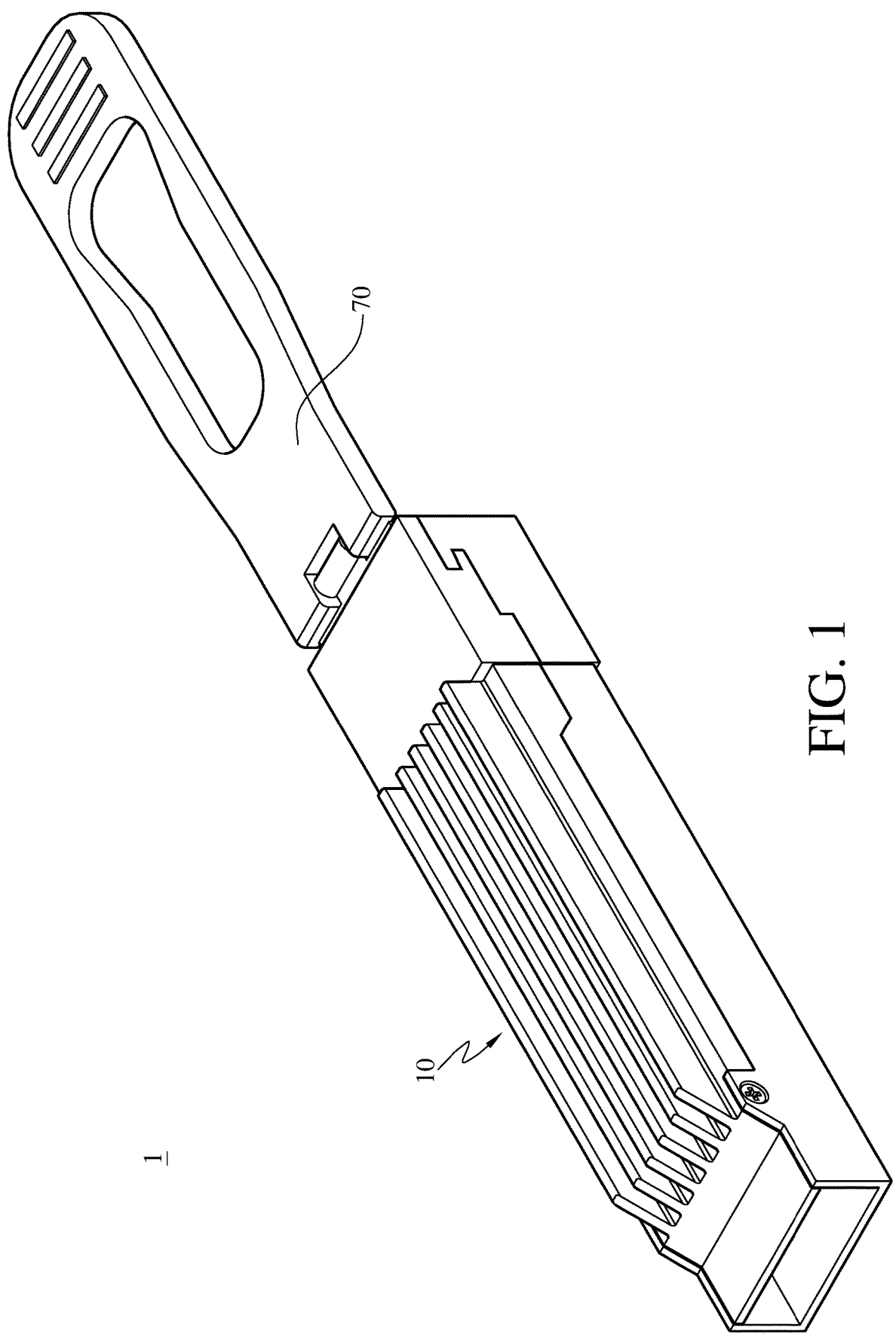
FIG. 1 is a perspective view of an optical transceiver in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
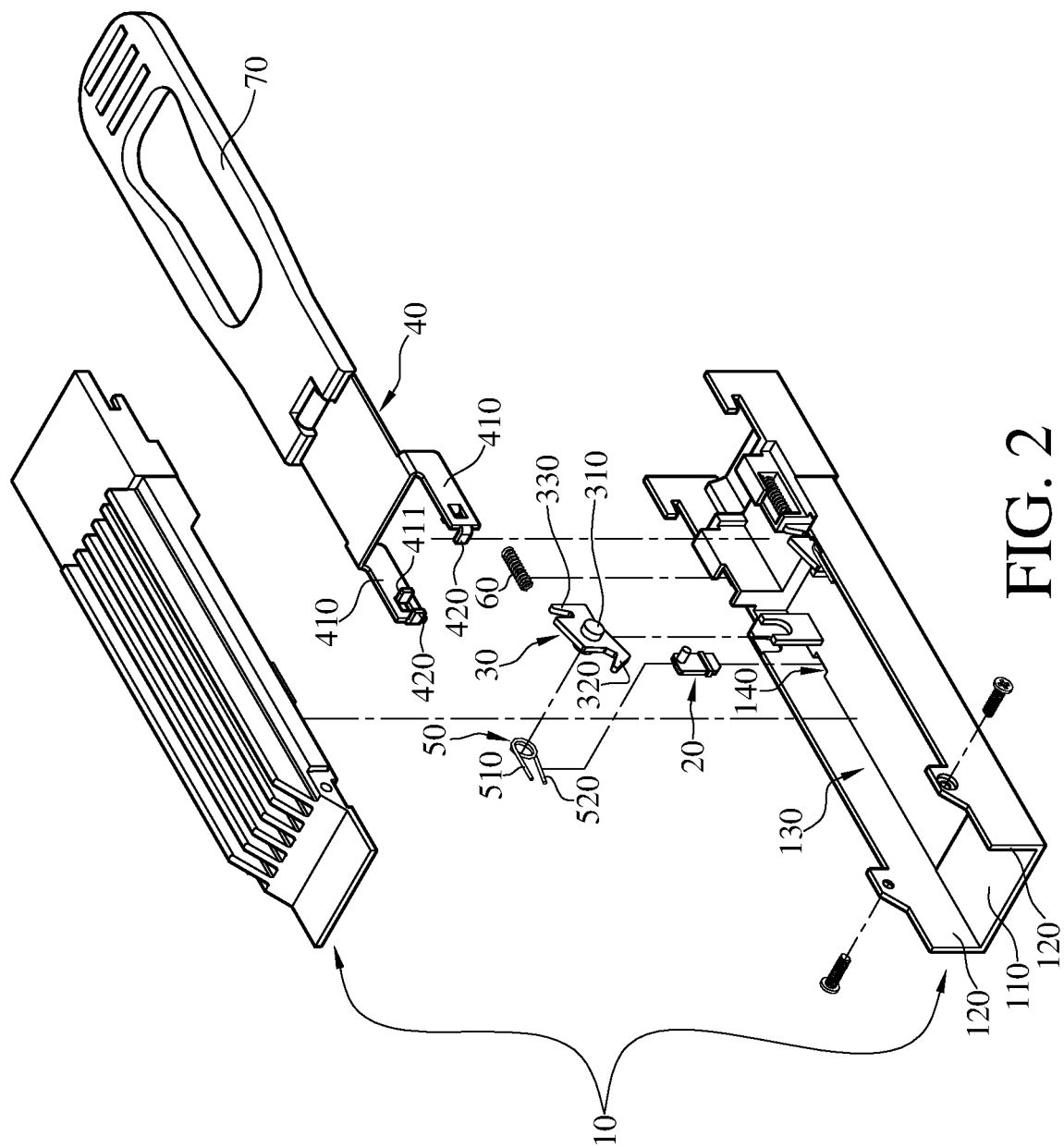
FIG. 2 is an exploded view of the optical transceiver in FIG. 1.
Figure 3:
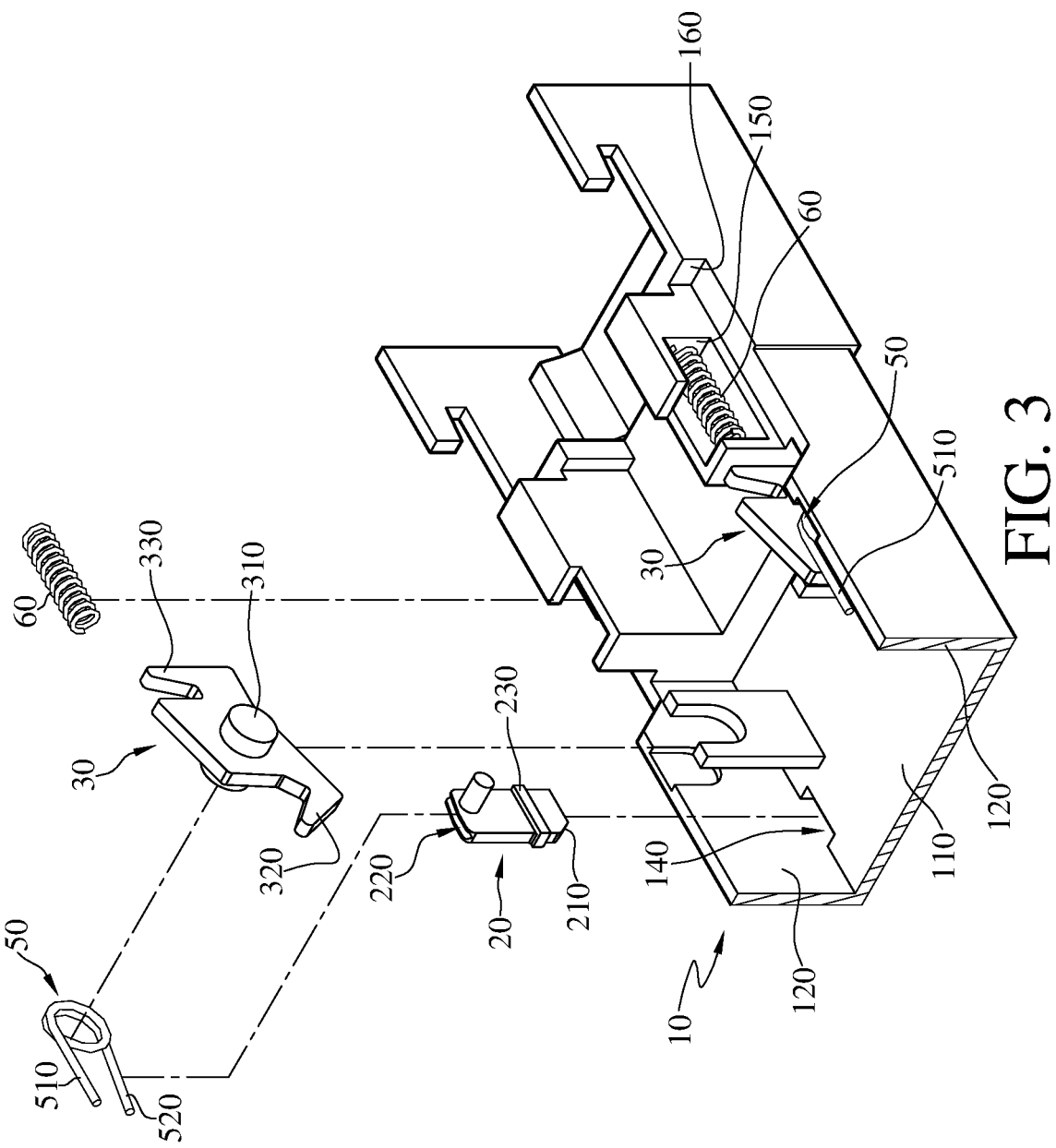
FIG. 3 is a partial enlarged view of the optical transceiver in FIG. 2.
Figure 4:
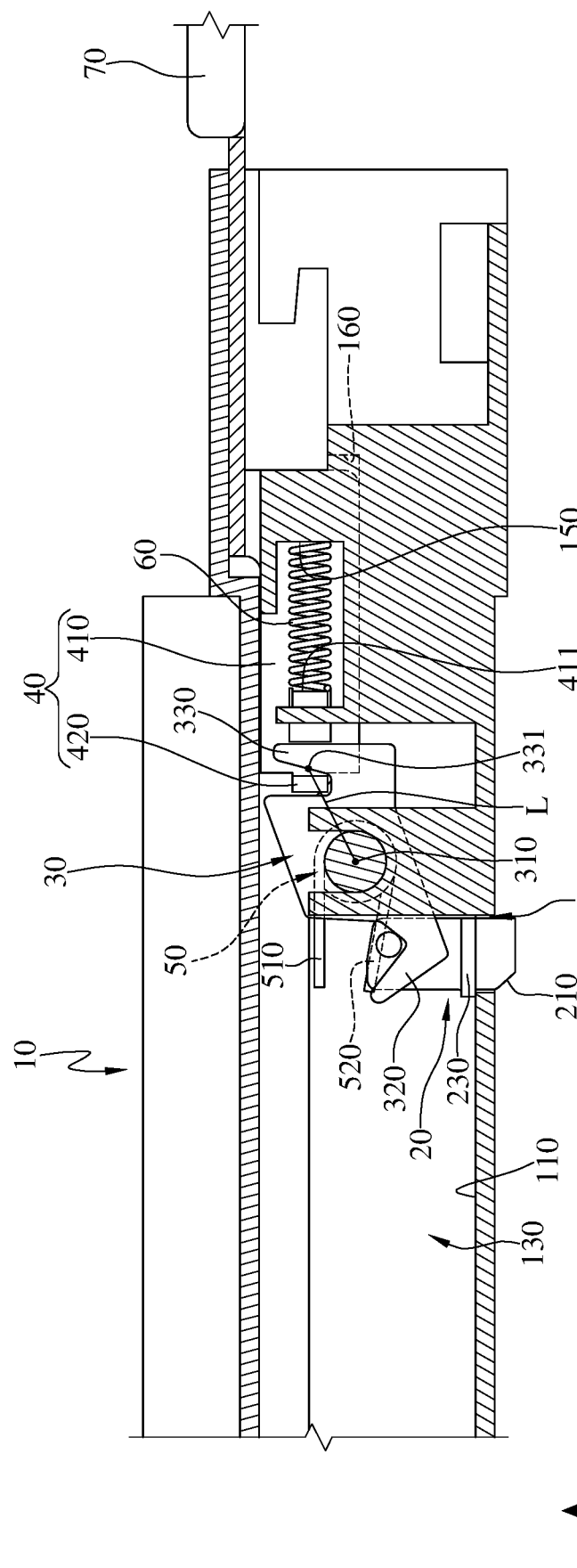
FIG. 4 is a partial enlarged cross-sectional view of the optical transceiver in FIG. 1.
Figure 5A:
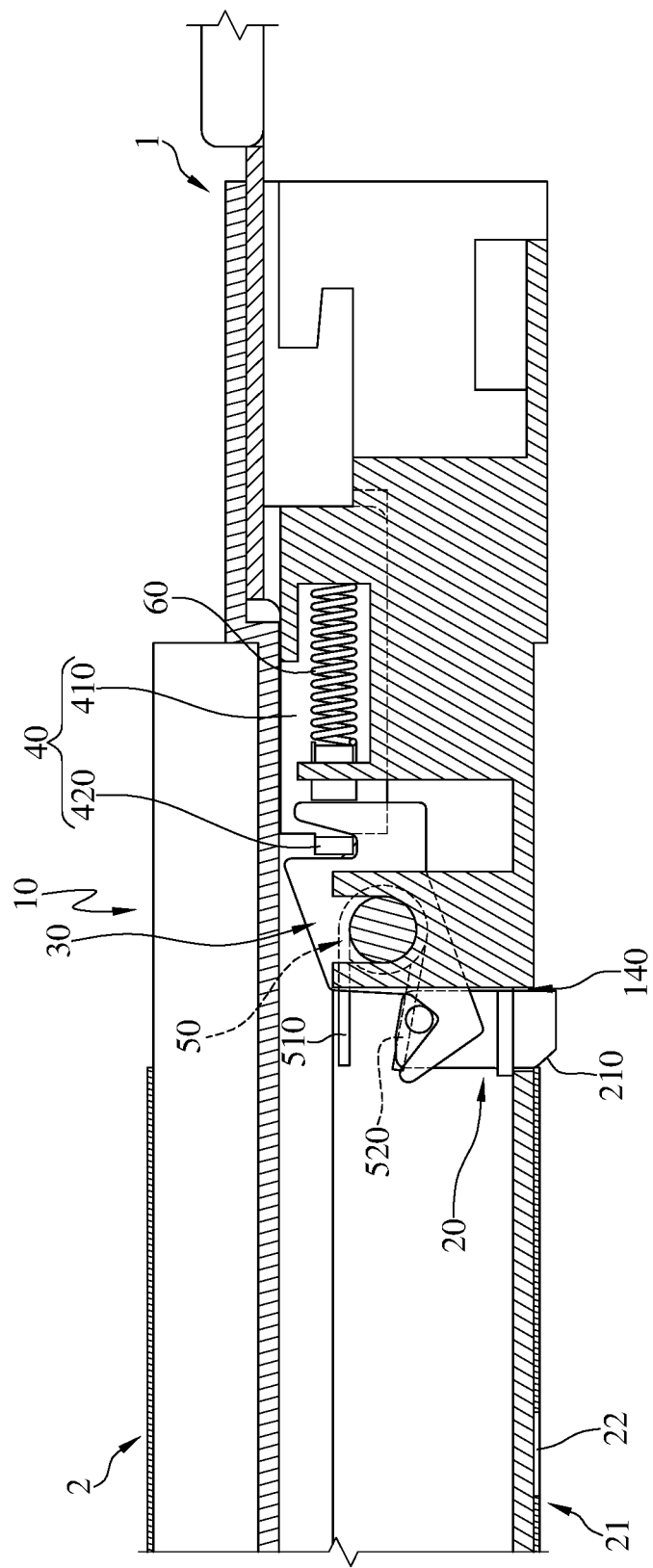
FIGS. 5A-5C are partial enlarged cross-sectional views of the optical transceiver in FIG. 4 plugged into a receptacle.

Please refer to FIG. 1 to FIG. 4. FIG. 1 is a perspective view of an optical transceiver in accordance with one embodiment of the disclosure. FIG. 2 is an exploded view of the optical transceiver in FIG. 1. FIG. 3 is a partial enlarged view of the optical transceiver in FIG. 2. FIG. 4 is a partial enlarged cross-sectional view of the optical transceiver in FIG. 1. In this embodiment, an optical transceiver 1 is provided. The optical transceiver 1 includes a casing 10, two fastening assemblies and a driving member 40. Each of the fastening assemblies includes a fastening member 20, a pivotal member 30, a restoring member 50 and an elastic member 60. However, the amount of the fastening assemblies in the optical transceiver is not restricted. In other embodiments, the optical transceiver may just include one fastening assembly. The optical transceiver 1 is adaptive to be plugged into a receptacle (e.g., a receptacle 2 as shown in FIG. 5A). The receptacle 2 has a fastening portion 21. The fastening portion 21 has two fastening holes 22 in this embodiment. It is worth noting that the number of the fastening holes is not limited as the result.

The casing 10 has a bottom surface 110 and two side surfaces 120. The two side surfaces 120 are connected to two opposite sides of the bottom surface 110. The bottom surface 110 and the two side surfaces 120 together form an accommodating space 130 therebetween. The casing 10 further has two through holes 140 on the bottom surface 110, and the accommodating space 130 is connected to the two through holes 140. The two fastening assemblies respectively correspond to the two fastening holes 22 and respectively correspond to the two through holes 140. In this embodiment, the casing 10 includes a top casing (not labeled) and a bottom casing (not labeled), and the bottom casing has the bottom surface 110 and the side surfaces 120. In other embodiments, however, the casing could be made in one piece.

The fastening members 20 are movably disposed in the accommodating space 130 of the casing 10. The fastening members 20 respectively correspond to the through holes 140. In addition, each of the fastening members 20 has a guiding inclined surface 210.

The pivotal members 30 are pivoted on the casing 10 and located in the accommodating space 130. In detail, each pivotal member 30 includes a pivoting shaft 310, a pressing portion 320 and a pressed portion 330. The pivoting shaft 310 is located between the pressing portion 320 and pressed portion 330. The pivoting shafts 310 of the pivotal members 30 are respectively pivoted on the two side surfaces 120 of the casing 10. The positions of the pressing portions 320 respectively correspond to the fastening members 20. In addition, the pressed portions 330 of the pivotal members 30 each has a pressed point 331.

The driving member 40 includes two driving assemblies, and each of the driving assemblies includes an extending arm 410 and a bent portion 420. The extending arms 410 are movably disposed in the accommodating space 130 of the casing 10. The bent portions 420 are respectively connected to the two ends of the extending arms 410, and respectively correspond to the pressed portions 330 of the pivotal members 30. The driving member 40 is movable with respect to the casing 10 in a press direction P (as shown in FIG. 4). The press direction P is substantially orthogonal to a normal direction N of the bottom surface 110 of the casing 10. When the driving member 40 is moved along the press direction P, the bent portions 420 could press the pressed portions 330 of the pivotal members 30 so as to pivot the pivotal members 30 with respect to the casing 10. In detail, when the pivotal member 30 is pressed by the driving member 40, the pressed points 331 on the pressed portions 330 are pressed by the bent portions 420, and a virtual line L passing through the pressed point 331 and the pivoting shaft 310 of the pivotal member 30 is not parallel to the press direction P. Thus, a torque is on the pressed point 331 to pivot the pivotal member 30 when the driving member 40 presses the pressed portion 330. In this embodiment, the driving member 40 could press the pressed portions 330 through point contact, line contact or surface contact. When the pivotal member 30 is pivoted with respect to the casing 10 by the driving member 40, the driving member 40 forces the pressing portions 320 of the pivotal member 30 to move the fastening member 20 along the normal direction N to be either in a fastened position (as shown in FIG. 4) or a released position (please refer to FIG. 5B).

The restoring member 50 is, for example, a torsion spring. The restoring member 50 is disposed on the pivotal member 30. In detail, the restoring member 50 is sleeved on the pivoting shaft 310 of the pivotal member 30. A fixed end 510 of the restoring member 50 is fixed on the casing 10, and a pressed end 520 of the restoring member 50 corresponds to the fastening member 20. When the fastening member 20 is in the fastened position, the fastening member 20 may be slightly in contact with or not in contact with the pressed end 520 of the restoring member 50. When the fastening member 20 is in the released position, the restoring member 50 is pressed by the fastening member 20 to store elastic energy. The restoring member 50 is able to release the elastic energy to move the fastening member 20 from the released position to the fastened position. In this embodiment, the fixed end 510 of the restoring member 50 is in contact with the side surface 120 of the casing 10, but how and where the fixed end 510 is positioned are not therefore limited as the result. In other embodiments, the fixed end 510 of the restoring member 50 can be engaged into the bottom surface 110 of the casing 10.

The elastic member 60 is, for example, a compression spring. The elastic member 60 is disposed in the accommodating space 130 of the casing 10. In this embodiment, the casing 10 further has two first restricting surfaces 150, and the extending arms 410 of the driving member 40 each has a second restricting surface 411. The second restricting surfaces 411 of the extending arms 410 respectively face the first restricting surfaces 150 of the casing 10. The elastic members 60 are disposed between the first restricting surfaces 150 and the second restricting surfaces 411.

Figure 5B:
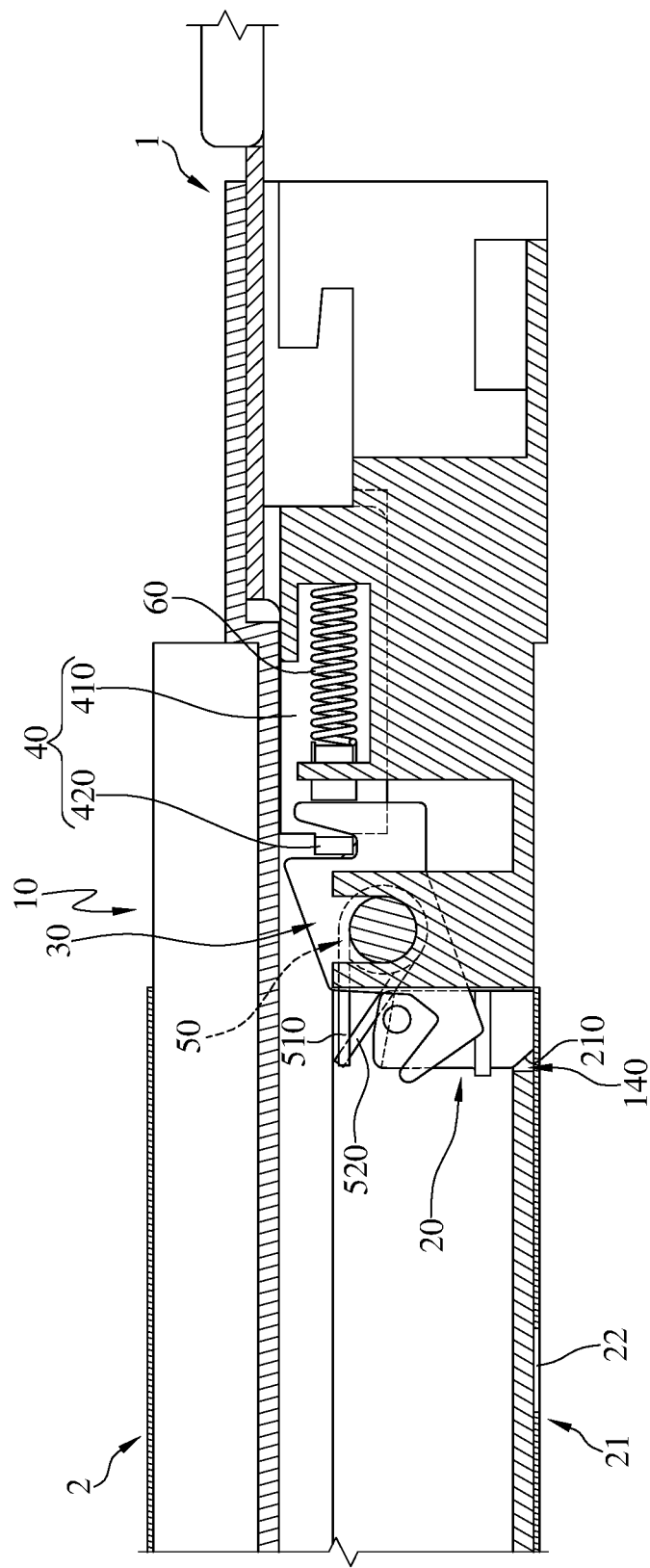
Figure 5C:
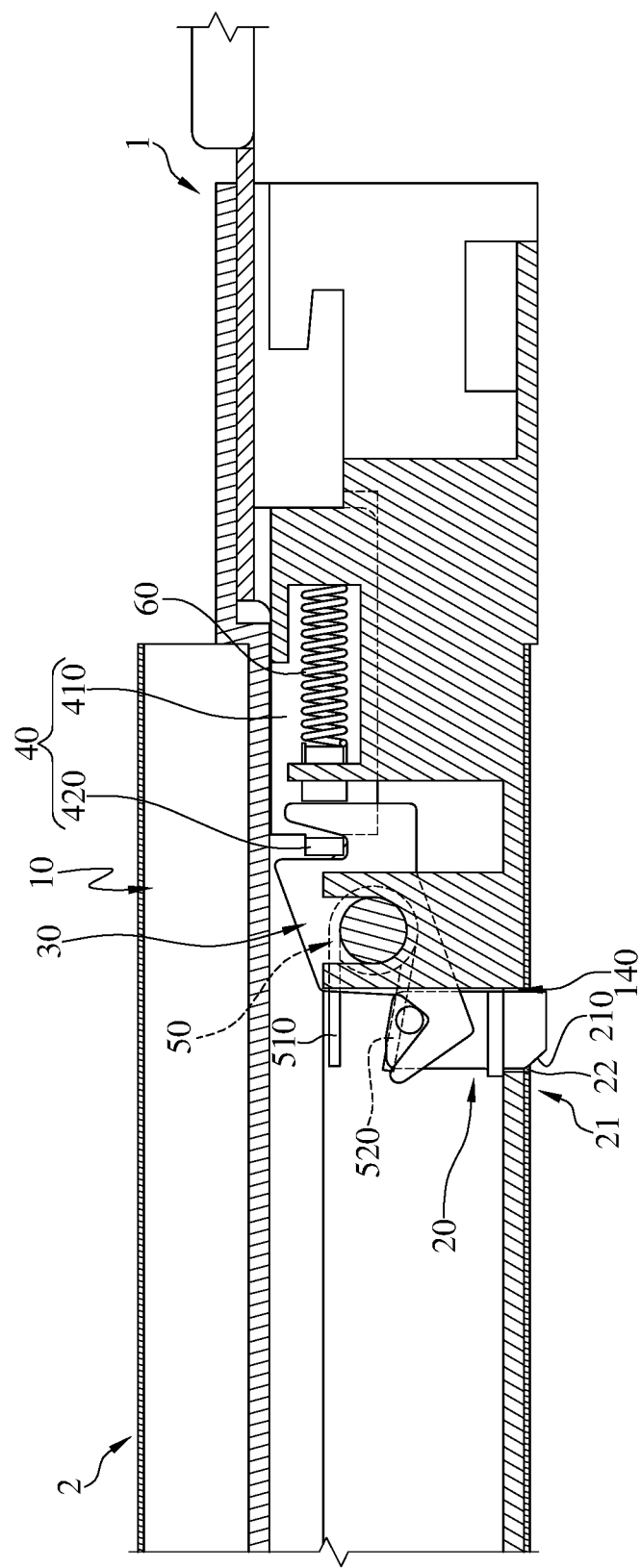

Please refer to FIG. 4 and further refer to FIGS. 5A-5C. FIG. 5A to FIG. 5C are partial enlarged cross-sectional views of the optical transceiver in FIG. 4 plugged into the receptacle. As shown in FIG. 4, the fastening member 20 is in the fastened position. The fastening member 20 protrudes through the through hole 140 of the casing 10, and the bent portion 420 of the driving member 40 faces the pressed portion 330 of the pivotal member 30. At this moment, the pressing portion 320 of the pivotal member 30 may have no pressure on the fastening member 20.

Then, as shown in FIG. 5A and FIG. 5B, the optical transceiver 1 is plugged into the receptacle 2, and the guiding inclined surface 210 of the fastening member 20 is pressed by an edge of the receptacle 2. Due to the guiding inclined surface 210, the fastening member 20 is able to be moved from the fastened position to the released position by moving the casing 10. While the fastening member 20 is moved from the fastened position to the released position, the restoring member 50 is pressed by the fastening member 20 to store the elastic energy. When the fastening member 20 is in the released position, the fastening member 20 does not block the receptacle 2, allowing for the casing 10 be plugged into the receptacle 2 smoothly.

Then, as shown in FIG. 5C, the casing 10 moves until the fastening hole 22 of the fastening portion 21 is aligned with the through hole 140. At this moment, the restoring member 50 releases its elastic energy to move the fastening member 20 to penetrate through the through hole 140 and the fastening hole 22. In such a case, the fastening member 20 is fastened to the fastening portion 21 of the receptacle 2, completing the insertion of the optical transceiver 1.

Figure 6A:
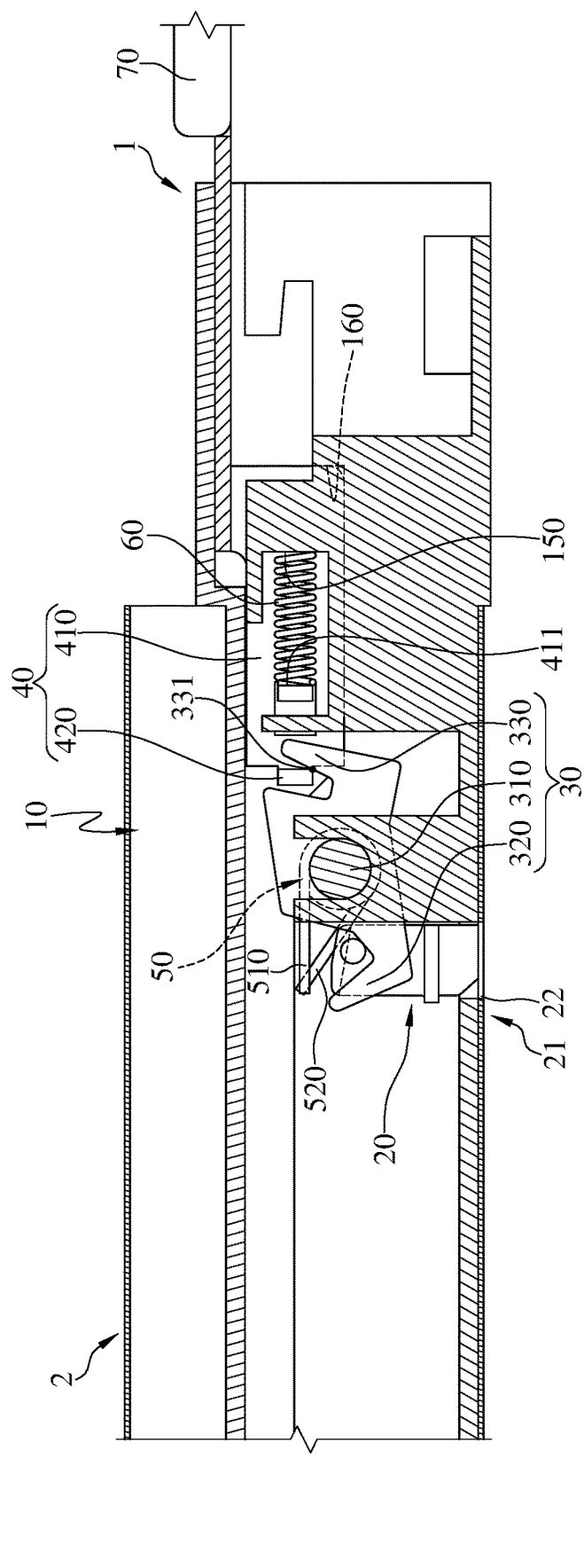
FIGS. 6A-6B are partial enlarged cross-sectional views of the optical transceiver in FIG. 5C pulled out from the receptacle.
Figure 6B:
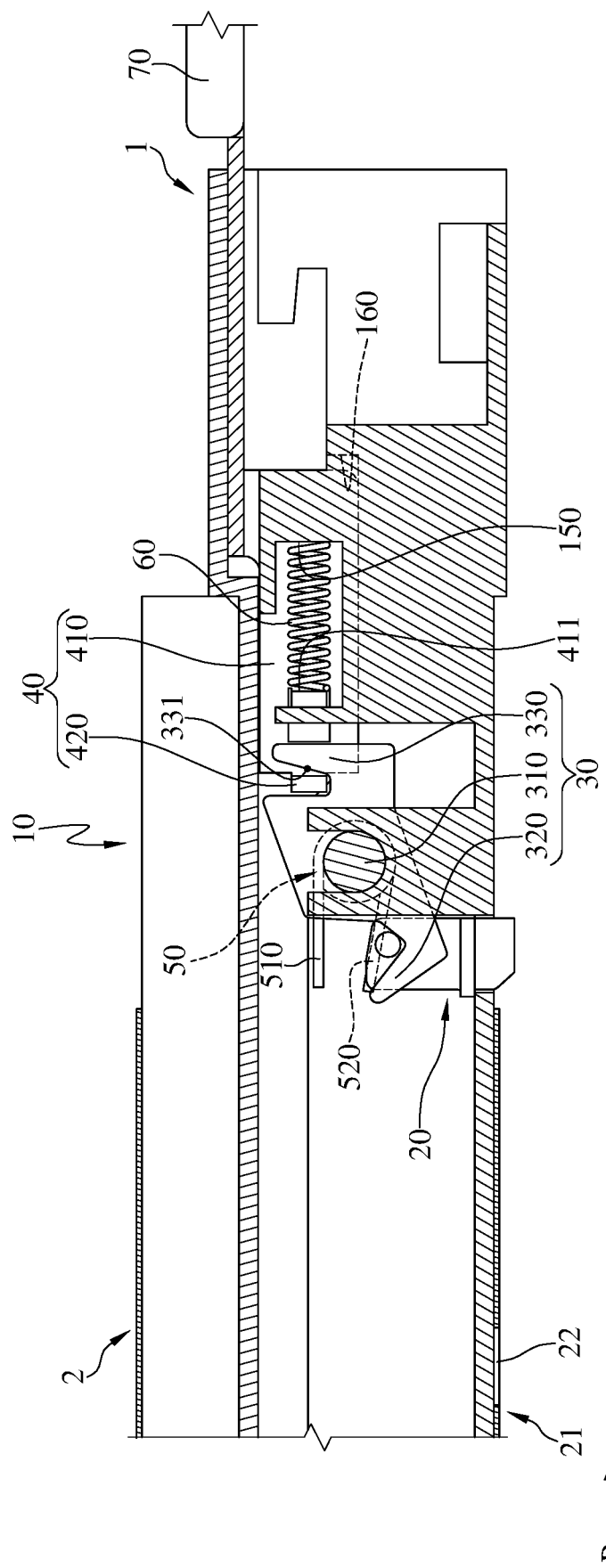

Then, please refer to FIG. 6A and FIG. 6B, the optical transceiver 1 is able to be pulled out with the pull of the handle 70. FIG. 6A and FIG. 6B are partial enlarged cross-sectional views of the optical transceiver in FIG. 5C pulled out from the receptacle. As shown in FIG. 6A, the driving member 40 is moved along the press direction P by the pull of the handle 70. While the driving member 40 is moved along the press direction P, the bent portion 420 of the driving member 40 presses the pressed portion 330 of the pivotal member 30 so as to produce a torque to pivot the pivotal member 30 with respect to the casing 10. While the pivotal member 30 is pivoted, the pressing portion 320 of the pivotal member 30 moves the fastening member 20 from the fastened position to the released position. When the fastening member 20 is moved to the released position, the fastening member 20 is removed from the fastening hole 22 of the fastening portion 21, allowing for the casing 10 to be pulled out from the receptacle 2 along the press direction P. In addition, when the fastening member 20 is in the released position, the restoring member 50 stores the elastic energy because the pressed end 520 is pressed by the fastening member 20. On the other hand, when the driving member 40 is moved along the press direction P, the second restricting surface 411 is moved closer to the first restricting surface 150 of the casing 10 to compress the elastic member 60. The elastic member 60 stores elastic energy when being compressed.

As shown in FIG. 6B, the casing 10 is pulled out from the receptacle 2. In such a case, when the handle 70 is released, the elastic member 60 can release its elastic energy to move the driving member 40 in the opposite direction and cause the bent portion 420 to stop pressing the pressed portion 330 of the pivotal member 30. At this moment, the restoring member 50 releases its elastic energy to move the fastening member 20 back to the fastened position to penetrate through the through hole 140.

To ensure that the fastening member 20 could be moved to the fastened position, the fastening member 20 should be well in contact with the restoring member 50 while it is in the released position. Please refer to FIG. 3, the sides of the fastening members 20 close to the restoring members 50 each has an accommodating slot 220. When the fastening members 20 press the restoring members 50, the pressed ends 520 of the restoring members 50 are positioned in the accommodating slots 220 to ensure that the fastening members 20 and the restoring members 50 are well in contact with each other.

Further, as shown in FIG. 3 and FIG. 4, each of the fastening members 20 includes a protruding edge 230, The protruding edge 230 protrudes in a direction which is substantially orthogonal to the moving direction (i.e., the normal direction N of the bottom surface 110 of the casing 10) of the fastening member 20. When the fastening member 20 is in the fastened position, the protruding edge 230 and the bottom surface 110 are in tight contact with each other, which is beneficial to prevent the electromagnetic interference (EMI) from affecting electronic components in the optical transceiver 1 and electronic devices around the receptacle 2 when it is plugged into the receptacle 2.

Moreover, as shown in FIG. 3, FIG. 4 and FIG. 6A, the casing 10 further has a stopping surface 160. When the fastening member 20 is moved to the released position, the driving member 40 presses against the stopping surface 160, such that the stopping surface 160 could stop the extending arm 410 of the driving member 40 from moving along the press direction P in order to prevent the driving member 40 from being damaged when the driving member 40 is pulled too hard.

According to the optical transceiver as discussed above, while the pivotal member is pressed by the driving member, because the virtual line passing through the pressed point of the pivotal member and the pivoting shaft of the pivotal member is not parallel to the press direction of the driving member, a torque is produced on the pressed point to pivot the pivotal member with respect to the casing and to force the pivotal member to move the fastening member from the fastened position to the released position. Thus, the fastening member can be engaged with or disengaged from the fastening portion in a fast and efficient manner, rendering more convenient the use of the optical transceiver.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An optical transceiver, configured for being plugged into a receptacle having a fastening portion, comprising:
    a casing comprising top and bottom casings, the bottom casing to slidably couple with a surface of the receptacle that supports the casing when inserted into the receptacle, the bottom casing having a bottom surface and side surfaces that extend from the bottom surface and together form an accommodation space therebetween, and wherein the top casing is configured couple to the side surfaces opposite the bottom surface to at least partially enclose the accommodation space;
    a driving member, disposed on the casing, and the driving member movable with respect to the casing in a press direction;
    a pivotal member, comprising a pivoting shaft and a pressed portion connected to each other, the pivoting shaft of the pivotal member pivoted on the casing and having an axis of rotation that extends substantially parallel with a bottom surface of the casing, the pressed portion having a pressed point, the press direction not parallel to a virtual line passing through the pressed point and the pivoting shaft; wherein when the driving member is moved in the press direction to press the pressed point the pivotal member is pivoted; and
    a fastening member movably disposed on the bottom casing to be either in a fastened position or a released position; wherein the pivotal member is pivotable to move the fastening member towards the top casing to transition from the fastened position to the released position.

2. The optical transceiver according to claim 1, further comprising a restoring member disposed on the pivotal member and fastened to the casing, wherein when the fastening member is in the released position, the restoring member is pressed by the fastening member to store elastic energy for moving the fastening member from the released position to the fastened position.

3. The optical transceiver according to claim 2, wherein the restoring member is a torsion spring.

4. The optical transceiver according to claim 2, wherein a side of the fastening member close to the restoring member has an accommodating slot and a part of the restoring member is located in the accommodating slot when the restoring member is pressed by the fastening member.

5. The optical transceiver according to claim 1, wherein the press direction is substantially orthogonal to a normal direction of the bottom surface of the casing.

6. The optical transceiver according to claim 5, further comprising an elastic member, wherein the casing further has a first restricting surface, the driving member has a second restricting surface, the first restricting surface faces the second restricting surface, and the elastic member is disposed between the first restricting surface and the second restricting surface.

7. The optical transceiver according to claim 5, wherein the casing further has a stopping surface and the driving member presses against the stopping surface when the fastening member is in the released position.

8. The optical transceiver according to claim 1, wherein the number of the fastening members is, and the number of the pivotal members is two, the two fastening members are respectively disposed on the side surfaces of the casing, and the two pivotal members are respectively pivoted on the side surfaces of the casing.

9. The optical transceiver according to claim 1, wherein the fastening portion has a fastening hole, the bottom surface of the casing has a through hole, and when the fastening member is in the fastened position, the fastening member protrudes through the through hole and the fastening hole so as to be fastened to the fastening portion of the receptacle.

10. The optical transceiver according to claim 9, wherein the fastening member has a protruding edge protruding in a direction which is substantially orthogonal to an moving direction of the fastening member and the protruding edge presses against the bottom surface of the casing when the fastening member is in the fastened position.

11. The optical transceiver according to claim 1, wherein the fastening member has a guiding inclined surface, and the guiding inclined surface is adaptive to press against an edge of the receptacle.

\* \* \* \* \*